Aug. 29, 1961  G. O. ETCHISON  2,997,772
APPARATUS FOR BONDING FABRIC
Filed Aug. 22, 1958  3 Sheets-Sheet 3
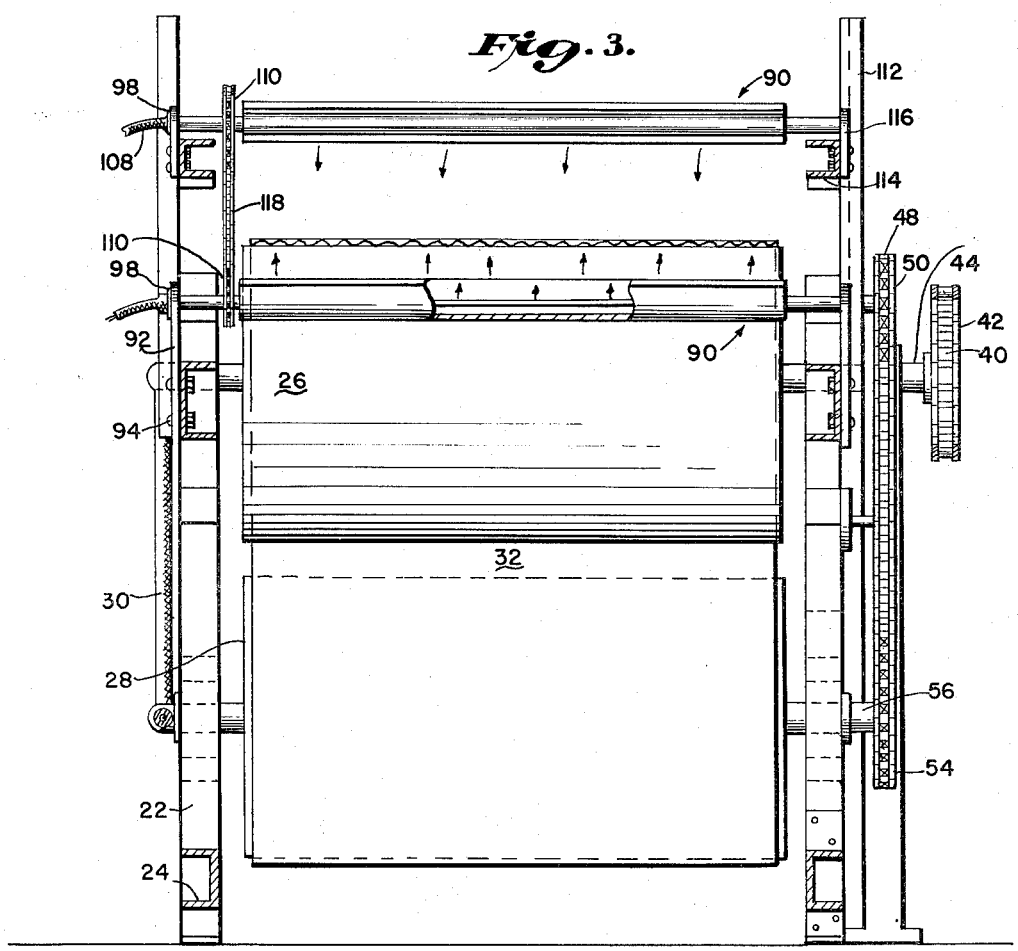
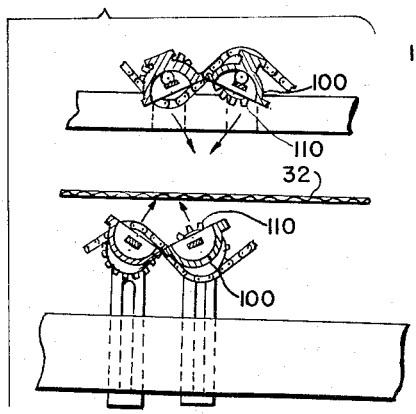
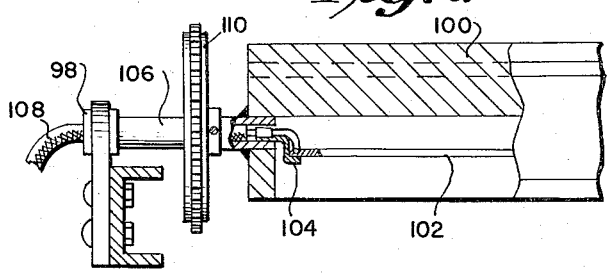
INVENTOR
GIBSON O. ETCHISON
BY Cushman, Darby & Cushman
ATTORNEYS

2,997,772
APPARATUS FOR BONDING FABRIC
Gibson O. Etchison, Shawmut, Ala., assignor to West Point Manufacturing Company, West Point, Ga., a corporation of Georgia
Filed Aug. 22, 1958, Ser. No. 756,587
2 Claims. (Cl. 28—1)

This invention relates to the bonding of fabric, and in particular to the manufacture of open mesh, loosely constructed woven fabric, wherein the warp and filling yarns are relatively widely spaced. Loosely woven or sleazy fabrics are finding increasing uses in industry, as in the reinforcement of plastic films. The production and handling of sleazy fabrics, however, involve considerable difficulty, in that the fabric is highly prone to distortion. This problem may be overcome by applying bonding material to the fabric while it is in squared and aligned condition, to adhere the yarns at the intersections or crossover points thereof, whereby the fabric may be durably fixed in proper configuration. Effective bonding of the fabric in this manner is in itself difficult, and the present invention is directed specifically to a novel and advantageous solution of this problem. The invention is useful also in the application of anchor coatings to relatively closely woven fabrics.

The principal object of the present invention is to provide improved and simplified methods and apparatus for bonding fabric. Related objects are to provide fabric bonding methods and apparatus effective to produce open weave fabrics of uniformly excellent quality and durability, at high production rates. Further objects will be in part evident and in part pointed out hereinafter.

The invention and the novel features thereof may best be made clear from the following description and the accompanying drawings, in which:

FIGURE 3 is a vertical sectional view taken substantially on the line 3—3 of FIGURE 2;

FIGURE 4 is a fragmentary vertical sectional view illustrating the relationship of the radiant heater elements of the apparatus to the fabric path, and FIGURE 5 is a longitudinal sectional view, on enlarged scale, illustrating constructional details of a radiant heating element, and the adjustable mounting therefor.

Figure 1:
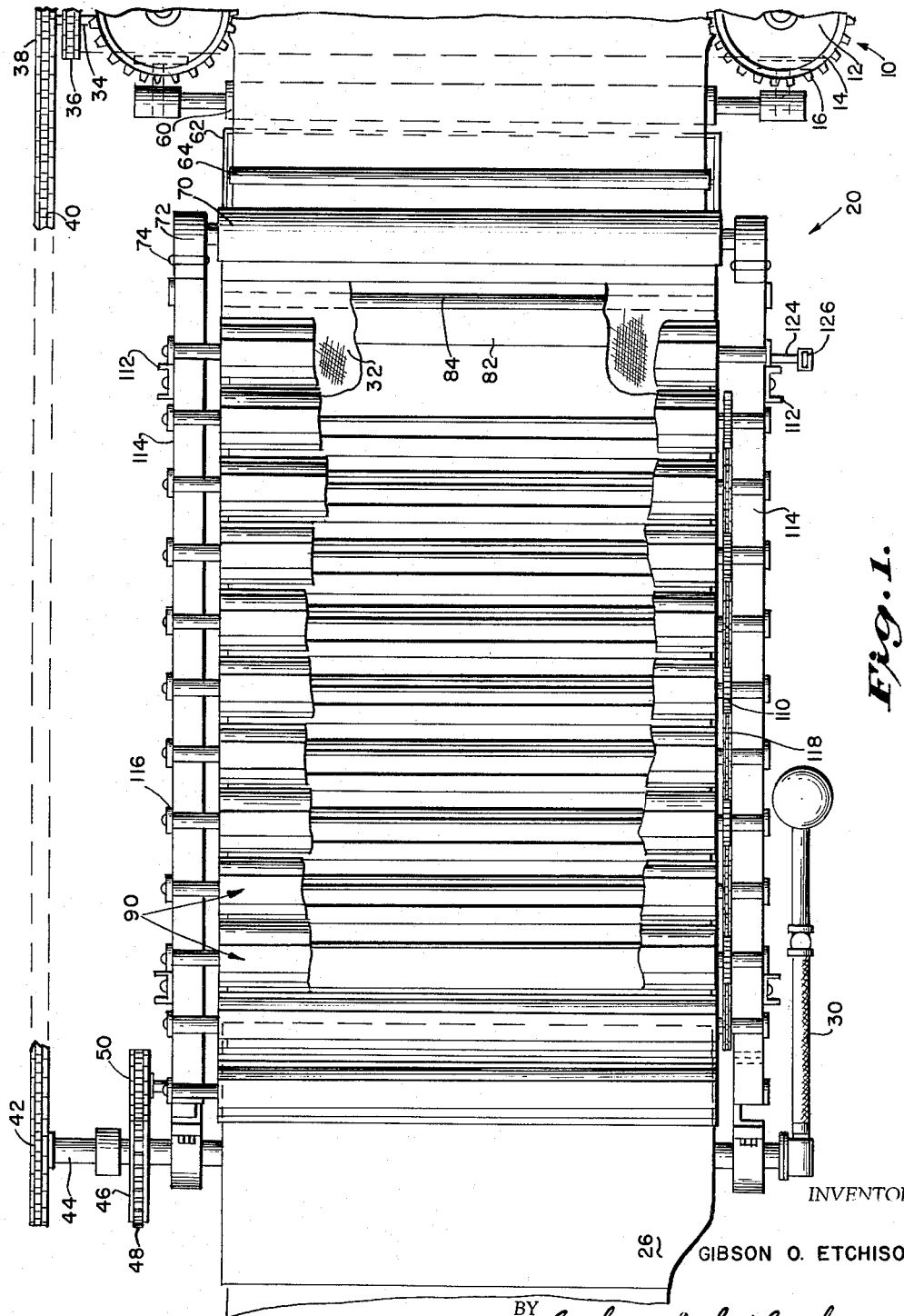
FIGURE 1 is a top plan view, partly broken away, of an exemplary embodiment of the apparatus of the present invention.
Figure 2:
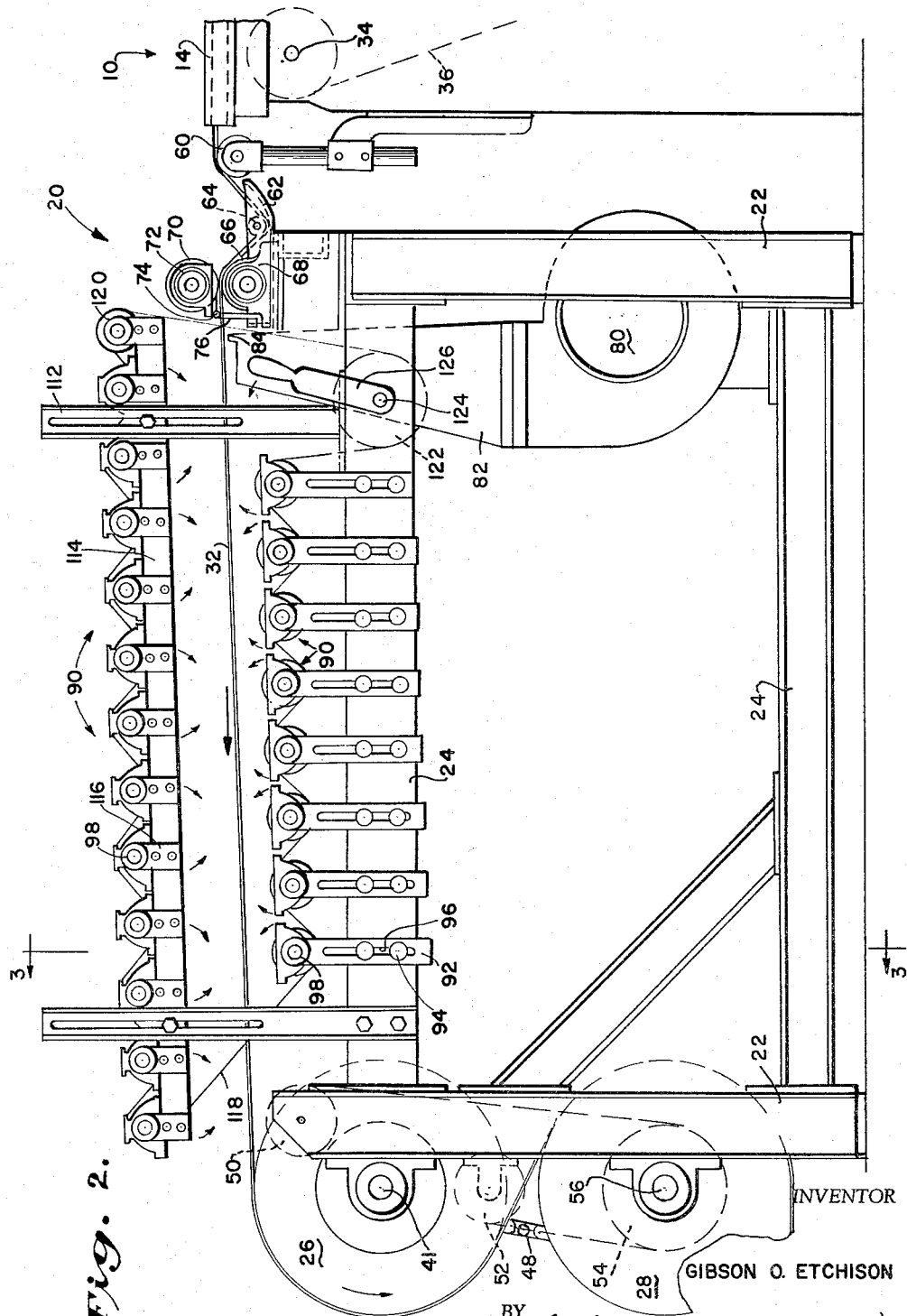
FIGURE 2 is a side elevational view of the apparatus of FIGURE 1.

Referring to the drawings, FIGURES 1 and 2 illustrate the discharge end of a short tenter frame 10, including the usual drive pulleys 12 and belts 14. The belts 14 may be provided with conventional pins or other fabric engaging elements, but preferably are provided with the illustrated hinge clips 16.

Closely adjoining the tenter frame and in longitudinal alignment therewith is the bonding apparatus indicated generally as 20, mounted in a frame including vertical supports 22, longitudinal members 24 and appropriate transverse members. On the trailing vertical support 22 (left hand as viewed in FIGURES 1 and 2) are mounted a pair of conventional dry cans 26 and 28, one above the other. The dry cans may be for example fifteen inches in diameter, and are provided with the usual heating equipment, including steam lines 30. The upper surface of the upper dry can 26, preferably, is tangential to the plane of the fabric path through the tenter frame 10, whereby the fabric 32 may extend from the tenter to the dry can 26 in a substantially level path.

Means are provided to drive the cans 26 and 28 in unison, and at a speed coordinated with the tenter drive. As illustrated in FIGURE 1, the tenter is driven through input shaft 34, as by chain 36. To drive the cans 26 and 28, the tenter shaft 34 is provided with a sprocket 38, engaged in driving relationship by chain 40 to an appropriately sized sprocket 42 mounted on the drive shaft 44 of the upper dry can 26. Shaft 44 carries another sprocket 46, which is engaged by the chain 48 extending around idlers 50 and 52 (see FIGURES 2 and 3) and the similar sprocket 54 mounted on drive shaft 56 of the lower dry can 28. In this manner the dry cans are linked to counter-rotate at equal speeds.

At the outfeed end of the tenter frame 10 is mounted a guide roll 60. Closely adjacent the guide roll 60 a tank or pan 62 is mounted atop the leading vertical supports 22 of the bonding apparatus. A guide roll 64 is journalled in the pan 62, and a kisser roll 66 extends between bearings 68, the lower portion of the kisser roll extending into the pan. A backup or floating roll 70 may be provided above the kisser roll 66, the roll 70 being rotatably mounted in bearings 72 which are pivotally connected at 74 to posts 76. As will be understood, the floating roll 70 is by this mounting caused to ride the underlying kisser roll 66 under the influence of its own weight, exerting even pressure at all times on the fabric passing therebelow. Also, by means of its pivotal mounting the floating roll 70 may be readily displaced to inactive position, when not required or to permit cleaning of the kisser roll 66.

Between the leading vertical supports 22 of the bonding apparatus is mounted a fan 80, discharging through a transversely extending duct 82 and its end slot 84. As best shown in FIGURE 2, the slot 84 opens at a point immediately behind the kisser roll and just below the normal path of the fabric 32, which extends from the upper surface of kisser roll 66 to the upper surface of dry can 26.

As described, the pan 62 and associated elements are disposed at the leading end of the bonding apparatus and the dry cans 26 and 28 at the trailing end thereof, spaced a substantial distance from the pan. In this space, the fabric path is adjoined both above and below by rows of transversely extending radiant heaters 90. Referring to FIGURE 2, from each upper longitudinal member 24 of the bonding apparatus frame extends a plurality of vertical supports 92, each support being adjustably mounted by means of bolts 94 extending through an extended slot 96 in the support into the member 24. Between the upper ends of each aligned pair of supports 92 extends a radiant heater 90, the heater being rotatably mounted in the support bushings 98, as shown in FIGURE 5. Each radiant heater comprises a reflector housing 100 and a resistance bar 102 appropriately disposed therein, as by connector elements 104. A tubular mount 106 extends through each end of the reflector housing and outwardly therefrom, the connector elements 104 being mounted in the inner ends of the tubular mounts 106. The tubular mounts extend through the support bushings 98, and appropriate electrical conductors 108 pass through the tubular mounts 106 to the connector elements 104. A small sprocket 110 is fixed to the tubular mounts at corresponding ends of the radiant heaters.

Outwardly of the lower row of radiant heaters described above, vertical supports 112 extend upwardly from the upper longitudinal member 24 to a level above the path of the fabric 32, whereat they adjustably support longitudinal bars 114. Each bar 114 is provided with a plurality of appropriately spaced support elements 116. Each support element 116 at its upper end is provided with a support bushing 98, by means of which radiant heaters 90 are rotatably mounted between aligned pairs thereof, in the manner of the lower row previously described. Each radiant heater 90 of the upper row is provided with a sprocket 110 on its corresponding mount 106, and a chain 118 encircles all of the sprockets 110, idler sprocket 120, and the larger sprocket 122 mounted on a stub shaft 124 journalled in the member 24, as shown in FIGURE 2. A handle 126 extends from the outer end of stub shaft 124, by means of which the stub shaft may be rotated to displace the chain 118 and tilt the radiant heaters 90. As will be understood, movement of the chain 118 in either direction tilts all the heaters of both rows simultaneously and in different directions, each adjoining pair of heaters being oppositely tilted, as shown in FIGURE 4. When the handle 126 is rotated in counter-clockwise direction, as viewed in FIGURE 2, the individual heaters will be tilted as indicated by the arrows associated therewith, the degree of tilt being determined by the extent of movement of the handle.

Function and operation of the invention will now be described in detail. The fabric 32 may, for example, be an open mesh material with plain, leno or other weave, constructed of monofilament or multifilament nylon yarn, or yarn comprised of rayon, viscose, Fiberglas, or other natural or synthetic fiber. The tenter frame 10 may be very short, a length of five or six feet being adequate to stretch and square the fabric for the purpose of the present invention.

A body of liquid bonding material is maintained in the pan 62, suitable bonding materials including polyvinyl alcohol, polyvinyl acetate, other resinous materials, and natural and synthetic elastomeric latices and dispersions. The aligned and squared fabric leaving the tenter frame 10 passes over the guide roll 60, and may then pass under the guide roll 64 in the pan 62 and over the kisser roll 66. The kisser roll 66 and coacting floater roll 70 may be covered with wool felt or the like, to assist in thorough impregnation of the yarns of the fabric, these rolls effecting a squeezing action which forces the liquid binder through the mesh of the fabric and causes all yarns to be coated on all sides. The floater roll 70, when used, also tends to remove excess binder from the fabric, especially when the fabric is led through the liquid bonding material by the guide roll 64. In bonding particular fabrics with some binders, the guide roll 64 may be omitted and the fabric passed from the tenter guide roll 60 directly to the kisser roll 66, the application of bonding material by the kisser roll 66 being adequate for fabric stabilization.

The fabric leaving the kisser roll 66 may be thoroughly wetted or impregnated with bonding material, and in the case of open weave fabrics, numerous mesh openings in the fabric may be closed by liquid films extending thereacross. The air stream issuing from slot 84 passes through the fabric leaving the kisser roll 66, and is effective to break films bridging over the mesh openings and "unblind" the fabric openings at this point. The fabric passing from the position of slot 84 to the upper dry can 26 is free of disturbing influence or contact, and may be subjected to radiant heating by the heaters 90, whereby the temperature of the wetted fabric is appropriately raised to initiate drying or setting of the binder material. For this initial heating, it has been found advantageous to direct the radiant heating at acute and diverse angles to the plane of the fabric, so that the heat effect is not confined to the upper and lower surfaces of the yarns, but is directed also against the sides of the yarns of the fabric, and particularly at the crossing points thereof. As previously stated, the radiant heaters 90 may be adjustably tilted to angular position, as shown in FIGURE 4, by means of the handle 126 and chain 118, and optimum angular disposition of the heaters for particular types and weights of fabric may be readily ascertained by experimentation.

The initially heated fabric then comes into contact with the upper dry can 26, travels around half its periphery, and then travels around the lower dry can 28.

The dry cans may be heated to any suitable temperature above the boiling point of water, and maintained at uniform temperature by regulation of the steam pressure therein. For most types of fabric and binder material, ten pounds' steam pressure in the dry cans is appropriate. The dry cans are desirably surfaced with some material to which conventional binder materials will not adhere. The dry cans may be chrome surfaced, but preferably are surfaced with polytetrafluoroethylene, such as that sold under the trademark "Teflon."

It has been found that sleazy materials of the type described may be wetted or impregnated with liquid bonding materials, and dried in contact with dry cans, without disturbing the squared condition of the fabric, and at a relatively high rate of speed. For example, an open weave fabric comprising multifilament nylon yarn, 210 denier, 34 filaments, may be impregnated with a synthetic elastomeric latex or dispersion and dried in contact with a dry can without distortion of the fabric, at a rate of five yards per minute or more, the pickup of bonding material being about 25% on a dry weight of fabric basis. The fabric passes from the kisser roll 66 of the bonding apparatus to the dry can 26 undisturbed, and is effectively dried in contact with the dry can 26, the binder joining the yarns of the fabric at their crossing points, whereby the fabric is strengthened and stabilized in squared condition. In most cases, the drying of the binder is materially assisted by the radiant heaters, although in some applications the binding material may be dried by the dry cans alone. The radiant heating is also effective, in the case of some binding materials, to reduce the tendency of the fabric to stick to the dry cans. The bonded fabric, of course, is capable of ordinary handling and processing without distortion.

It has been noted that the fabric tends to shrink on the dry can 26, and it is essential for optimum operation that the fabric be maintained under tension until stabilized, since uncontrolled shrinkage if permitted is apt to distort the fabric. In the illustrative embodiment, the dry can 28, operating at a surface speed equal to that of the dry can 26, serves to maintain the fabric in tensioned and tentered condition in passage from the kisser roll 66 to the dry can 26 and around the dry can 26. While the dry can 28 serves primarily to control shrinkage, it also serves to complete the drying of the effectively stabilized fabric, and additional dry cans may be provided for this purpose, if required.

For some applications, the stabilized fabric may be passed through the bonding apparatus one or more additional times, picking up an additional 10% or so of binder material with each pass, also on a dry weight of fabric basis. Alternatively, a number of bonding apparatuses may be utilized in succession, the fabric passing for example from the dry can 28 of the apparatus illustrated directly into the bonding material pan of a similar apparatus directly following in line.

It will thus be seen that there has been provided by this invention a method and apparatus in which the various objects hereinbefore set forth, together with many practical advantages, are successfully achieved. As various possible embodiments may be made of the novel features of the above invention, all without departing from the scope thereof, it is to be understood that all matter hereinbefore set forth or shown in the accompanying drawings is to be interpreted as illustrative, and not in a limiting sense.

What is claimed is:

1. Apparatus for bonding the yarns of an open mesh fabric together at their intersections comprising a tenter, means for driving said tenter, a roll mounted in alignment with and spaced from the delivery end of said tenter, means for heating said roll, means for driving said roll at a speed coordinated with the speed of said tenter, means adjacent the delivery end of said tenter for applying liquid bonding material to a length of fabric extending from said tenter to said roll, radiant heating means leading said roll and disposed on both sides of the fabric path, and adjustable means for directing said radiant heating means toward said fabric path at an acute angle.

2. Apparatus as defined in claim 1, including means trailing said bonding material applying means and leading said radiant heating means for causing an air flow across the fabric path.

References Cited in the file of this patent

UNITED STATES PATENTS

| | | |
|---|---|---|
| 163,801 | Palmer | May 25, 1875 |
| 519,200 | Partington | May 1, 1894 |
| 2,219,213 | Swain | Oct. 22, 1940 |
| 2,771,659 | Ball | Nov. 27, 1956 |

FOREIGN PATENTS

| | | |
|---|---|---|
| 619 | Great Britain | of 1907 |
| 857,485 | Germany | Dec. 1, 1952 |

OTHER REFERENCES

Advertisement, "Teflon Coated Slasher Cylinders and Drying Cans," Textile World, Fact-File mid-September 1956, page 176. (Copy in Division 21.)